United States Patent
Kay et al.

(10) Patent No.: US 7,308,549 B2
(45) Date of Patent: Dec. 11, 2007

(54) MEMORY CONTROL METHOD, STORAGE DEVICE, CONTROL PROGRAM, AND READABLE RECORD MEDIUM

(75) Inventors: Andrew Kay, Oxford (GB); Richard Miller, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 342 days.

(21) Appl. No.: 10/506,070

(22) PCT Filed: Mar. 6, 2003

(86) PCT No.: PCT/JP03/02684

§ 371 (c)(1),
(2), (4) Date: Feb. 22, 2005

(87) PCT Pub. No.: WO03/077133

PCT Pub. Date: Sep. 18, 2003

(65) Prior Publication Data

US 2005/0119987 A1 Jun. 2, 2005

(30) Foreign Application Priority Data

Mar. 9, 2002 (GB) .................................. 0205573.9

(51) Int. Cl.
*G06F 12/00* (2006.01)

(52) U.S. Cl. .................... 711/170; 711/103; 711/118; 711/159; 711/165

(58) Field of Classification Search ................ 711/170
See application file for complete search history.

(56) References Cited

FOREIGN PATENT DOCUMENTS

| GB | 2386212 A | * | 9/2003 |
|----|-----------|---|--------|
| JP | 05-054076 |   | 3/1993 |
| JP | 06-342395 |   | 12/1994 |
| JP | 07-065591 |   | 3/1995 |
| JP | 2001-312425 |   | 11/2001 |

OTHER PUBLICATIONS

International Search Report for corresponding PCT/JP03/02684, mailed Apr. 22, 2003.

* cited by examiner

*Primary Examiner*—Reginald Bragdon
*Assistant Examiner*—Aracelis Ruiz
(74) *Attorney, Agent, or Firm*—Renner, Otto, Boiselle & Sklar, LLP

(57) ABSTRACT

A technique is provided for storing updated values of a data item in a segment of memory in which stored values cannot be individually overwritten, such as a flash memory. Each updated value is stored at an address which has space for a far pointer and a local pointer. When a new value is stored, the local pointer of the previous value is set to point to the address of the new value. When a chain of nodes of this type has been established and a further update value is to be stored, it is entered at a new node and a far pointer at a much earlier node of the chain is set to point to the new node so that the most recent value can be found without having to follow the local pointers in all of the previous nodes.

40 Claims, 8 Drawing Sheets

MEMORY CONTROL METHOD, STORAGE DEVICE, CONTROL PROGRAM, AND READABLE RECORD MEDIUM

TECHNICAL FIELD

The present invention relates to: a memory control method for storing temporally consecutive values to enable reading the latest value; a storage apparatus using the same; a control program which is used for the method or the apparatus; and a readable recording medium containing the program.

BACKGROUND ART

Such techniques may be used in systems embedded in, for example, a semiconductor chip, or the like and examples of suitable applications of the storage apparatus include: smart cards such as Java Cards™; digital active storage or security devices such as smart keys and smart disks; SIMs (Subscriber IdentityModule) and USIMs (Universal Subscriber IdentityModule) for mobile telephones; data logging devices; small devices which record user preferences, store settings or record usage situations; computer systems in vehicles; set-top boxes; and internet routers.

The term "Persistent Data Item" or "PDI" as used herein is defined to be a data item having associated with it a variable value which changes over time, in particular when updated by an application program, and which is required to retain its state between such updates, particularly when the application is not running and when power is removed intentionally, when the application is switched off, or accidentally, for example because of a power failure.

Computer programs operate by reading and updating the values of variables. For variables in RAM, this presents little difficulty as the values can be rewritten as often as necessary and reading and writing of data are fast. When the program is not running, its recording state must be stored in more persistent memory.

On small computer platforms such as smart cards, there is little RAM and the persistent memory often takes the form of EEPROM or Flash memory. This persistent memory has the property that, once a bit has been changed, it is not changed again until the whole segment is erased. In EEPROM, the segment size may be as small as a single byte (8 bits) and the persistent memory can be treated essentially as very slow RAM. In flash memory, the segments have generally large (e.g. 64 KB) memory capacities for silicon area efficiency and the erase operation is also slow. Also, the life of the persistent memory will eventually ends after some number of erase cycles (say 100,000 for high quality Flash). The advantage of flash memory is that much more memories can be packed into a given chip area so there is more storage space, but it is harder than EEPROM, to use efficiently.

Consider a smart card application which keeps a record of the date and time (obtained from a card reader terminal, perhaps) on each occasion that it runs various processes and checks the interval between runs. This could be used for a security function, such as increasing an amount of a daily withdrawal limit for a cash card. Every time it runs various processes, it must read the old run date, check the interval and store the new run date. The run date is therefore a PDI (persistent data item). If the run date were stored in the same location each time it changes, the whole 64K block would first have to be erased because of the physical memory limitations and this would take a long time and rapidly wear out the flash memory and make its life short.

Instead, each time the new date is written, it must be stored in a new area of memory. It is assumed that this program has to share the flash memory with other programs, so it is not efficient to pre-allocate a large block of flash memory just for this one application. In other words, there may be many PDIs in the system and PDIs might be updated at different rates, depending on the applications running various processes.

A known arrangement as disclosed in "General-Purpose Persistence Using Flash Memory", Jonathan T Moore, Michael Hicks, and Scott Nettles; Technical Report MS-CIS-97-3, CIS Dept. University of Pennsylvania, 1997, is to manage PDI (persistent data item) as (persistent data item) logs. Each time a PDI is updated, a log entry (update record) is written with the PDI's identity and the new value. To find the current value, the logs must be scanned to find the most recent value. When the block of the log entries (update record) is full, just the most recent values for each PDI can be copied to a fresh block, and the old block erased; this is called "garbage collection (collecting data recording areas which are not required any more for making them usable)". This solution is efficient in flash memory space but, in view of the search times, reading values is slow. Some values can be cached (searched) by copying them to RAM, but this uses up valuable RAM space and also requires extra time to search the cache. Writing is fast because it just requires appending a log (update record).

Another known arrangement builds a linked chain of values for each PDI as illustrated in FIG. 8 of the accompanying drawings. The first element of the chain is at a known address. Each element of the chain stores a value for the run date record and has a space for a pointer to the next item in the chain. The last chain element will have a pointer value equal to the erased memory pattern (FFFF in hexadecimal in this model or 0000 in the complementary model). To read the current update date, reading starts at the beginning of the chain and sequentially follows pointers until one is reached with value FFFF. To add a new update date, a new chain element is created with the new value and an empty pointer. The address is then stored over the pointer part of the previous last-element. When garbage collecting, the last value in the chain is copied to the new block and used as the start of the new chain.

Example: chain representing the value "date2" (with previous values "date1" and "date0").
Address Contents [value, pointer]

---

0120 [date0, 0236] // initial value = date0
.
.
.
0236 [date1, 0240] // value after first update = date1
.
.
.
0240 [date2, FFFF] // value after second update = date2

---

Now add the new value "date3", and suppose there is free memory at address 0332:

---

0120 [date0, 0236]
.
.
.

-continued

```
0236 [date1, 0240]
.
.
0240 [date2, 0332]
.
.
0332 [date3, FFFF]
```

The program code to achieve this is simple and compact (here C style is used to explain the algorithm):

```
newtype element = record {value v, element* next}
procedure updatevalue_chain(element* startaddress, value
newvalue)
    = {
        element* p = startaddress;
        element* newp = malloc(sizeof (element)); // space
for new element
                newp->v = newvalue; // store the new value in
the new element
                while (p.next != 0xFFFF) // search for the end
of the chain
                        do {p = p.next}
                p.next = newp; // make the previous pointer point
to the new element
        }
```

The problem is that, for each read or update, it is necessary to search through the whole chain of values. In a 64K memory segment, it might be necessary to search up to 16,000 entries (2+2 bytes per entry) when the chain is long and this is too slow in time to perform. If there are N entries, search time is proportional to N and the space required is (d+2) *N bytes, where d is the number of bytes to store a single value and pointers take two bytes. However, the solution is compact, each 2 byte value uses only 4 bytes for storage and, if the data stops being updated, at most 2 bytes at the end of the chain are wasted by being allocated but not used.

In another known arrangement as disclosed in "Data Management in a Flash Memory Based Storage Server", Mei-ling Chiang, Paul C H Lee and Ruei-Chuan Chang; National Chiao-Tung University, Hsinchu, Taiwan, R.O.C. and Academia Sinica, Nankang, Taiwan, R.O.C., the flash memory is divided into sub-blocks which are managed by the system. Blocks have to be rewritten (i.e., new values written to a new area of flash memory and the old block marked in some way as out-of-date) as a whole. This means that, if the blocks are too large, then memory is wasted (e.g., using a block of 32 bytes to store a 2 byte counter). If the blocks are too small, then there are too many blocks and the management overhead is wasteful of CPU searching time or RAM space or both.

In yet another known arrangement as disclosed in "Architecture of the PEVM: a High-Performance Orthogonally Persistent Java™", Brian Lewis, Bernd Mathiske, Neal Gafter; Sun-Microsystems, Inc., 901 San Antonio Road, Palo Alto, Calif. 94303-4900, USA, the contents of flash memory are managed as a virtual memory system with copy-on-write. Flash memory to be updated is copied into RAM and modified. If there is no space for the incoming block, then an old block is written back into flash. This can result in a whole block being rewritten because just a single byte in it has changed. This system adds a lot of time overhead to each access because lots of memory copying is required of blocks in and out of RAM.

In "Transacted Memory for Smart Cards", Pieter H Hartel, Michael J Butler, Eduard de Jong and Mark Longley; fphh, mjbg@ecs.soton.ac.uk and Eduard.deJong@Sun.COM; Technical Report DSSE-TR-2000-9, Aug. 16, 2000; Declarative Systems and Software Engineering Group, Department of Electronics and Computer Science, University of Southampton, Highfield, Southampton SO17 1BJ, United Kingdom, a small block size is assumed (e.g., 32 bytes) in a smart card memory and we are shown how to build transactional objects. In these objects, updates to arbitrarily many data items are performed as one (atomically) and, if the transaction is aborted for any reason before completion, it returns to its original state.

DISCLOSURE OF THE INVENTION

In order to solve the above-described conventional problems, the present invention provides: a memory control method in which PDIs can be updated fast, space allocated for the PDI in advance is not required, and the updates are sequentially proceeded to fill available space efficiently; a storage apparatus using the same; a control program which is used for the method or the apparatus; and a readable recording medium containing the control program.

According to a first aspect of the invention, there is provided a method as defined in the appended claim 1. According to a second aspect of the invention, there is provided an apparatus defined in the appended claim 19. According to a third aspect of the invention, there is provided a control program as defined in the appended claim 38. According to a fourth aspect of the invention, there is provided a readable recording medium as defined in the appended claim 39. Preferred embodiments of the invention are defined in the other appended claims.

In other words, a memory control method according to the present invention is a memory control method of storing temporally consecutive values of at least one data item in a memory segment of a type in which stored values cannot be individually overwritten, comprising the steps of: (a) storing sets of the consecutive values at respective address sections which are allocated temporally consecutively for the or each data item; (b) storing a far pointer to the address of at least one of the sets of values at an address section allocated before the address allocated to the set of values immediately preceding the at least one set; and (c) storing a local pointer to the address allocated to each set other than the at least one set at the address section allocated to the set immediately preceding each other set, thereby achieving the above-described objectives.

Preferably, in a memory control method according to the present invention, the memory segment is non-volatile.

Further preferably, in a memory control method according to the present invention, the memory segment is erasable only as a whole.

Further preferably, in a memory control method according to the present invention, the memory segment comprises at least part of a flash memory.

Further preferably, in a memory control method according to the present invention, the at least one set comprises a plurality of sets and the address section at which the far pointer of each respective set of the plurality of sets is stored is one which was allocated before the or each address at which is stored a far pointer to the or each other of the plurality of sets previous to the respective one set.

Further preferably, in a memory control method according to the present invention, the step (b) comprises storing a pointer to each $(A^B(C+1)+(A-B)+K)$th set at an address section allocated to a $(A^BC+(A-B)+K)$th set, where A is a predetermined integer constant greater than one, B is an integer parameter greater than zero, C is an integer parameter which is zero or greater, and K is a predetermined integer constant which is zero or greater.

Further preferably, in a memory control method according to the present invention, $1 \leq B \leq A$ and $K=0$.

Further preferably, in a memory control method according to the present invention, $A=4$.

Further preferably, in a memory control method according to the present invention, each the set comprises a single value.

Further preferably, in a memory control method according to the present invention, each the set comprises X values where X is an integer greater than one.

Further preferably, in a memory control method according to the present invention, for the or each the data item, a pointer to an address allocated to the first set is stored at an address section identified with the data item.

Further preferably, in a memory control method according to the present invention, each of the address sections contains sufficient storage space for the set of values, the local pointer and the far pointer.

Further preferably, in a memory control method according to the present invention, each of the address sections contains sufficient storage space only for the set of values and any pointer which is storable at the address.

Further preferably, in a memory control method according to the present invention, when the memory segment is full, the or each last value is copied to another memory segment after which the memory segment is erased.

Further preferably, in a memory control method according to the present invention, in a cache memory the current value, an address of the current value and the number of the sets of the at least one data item are stored.

Further preferably, a memory control method according to the present invention is a memory control method of storing temporally consecutive values of at least one data item in a memory segment of a type in which stored values cannot be individually overwritten, comprising the steps of: (a) storing sets of the consecutive values at respective address sections which are allocated temporally consecutively for the or each data item; (b) storing a far pointer to the address of at least one of the sets of values at an address section allocated before the address allocated to the set of values immediately preceding the at least one set; and (c) storing a local pointer to the address allocated to each set other than the at least one set at the address section allocated to the set immediately preceding each other set, said method comprising, starting with an address allocated to the first set: (i) checking the address for the presence of a far or local pointer; (ii) if a far pointer is present, performing the step (i) for the address to which the far pointer points; (iii) if there is a local pointer and no far pointer, performing the step (i) for the address to which the local pointer points; (vi) if there is neither a far pointer nor a local pointer, returning the latest value at the address, thereby achieving the above-described objectives.

Further preferably, in a memory control method according to the present invention, the step (i) comprises checking at least one pointer location at the address and indicating the presence of a pointer if the at least one location is in a non-reset state.

Further preferably, in a memory control method according to the present invention, the step (iv) comprises storing in a cache memory the latest value, a most recently stored far pointer, and the address allocated to the latest value.

Next, a storage apparatus according to present invention is a storage apparatus for storing temporally consecutively values of at least one data item, comprising a memory segment of a type in which stored values cannot be individually overwritten and means for storing sets of the consecutive values at respective address sections which are allocated temporally consecutively for the or each data item, characterised by comprising means for storing a far pointer to the address of at least one of the sets of values at an address section allocated before the address allocated to the set of values immediately preceding the at least one set, and means for storing a local pointer to the address allocated to each set other than the at least one set at the address section allocated to the set immediately preceding each other set, thereby achieving the above-described objectives.

Preferably, in a storage apparatus according to the present invention, the memory segment is non-volatile.

Further preferably, in a storage apparatus according to the present invention, the memory segment is erasable only as a whole.

Further preferably, in a storage apparatus according to the present invention, the memory segment comprises at least part of a flash memory.

Further preferably, in a storage apparatus according to the present invention, the at least one set comprises a plurality of sets and the address section at which the far pointer of each respective set of the plurality of sets is stored is one which was allocated before the or each address at which is stored a far pointer to the or each other of the plurality of sets to the respective one set.

Further preferably, in a storage apparatus according to the present invention, the far pointer storing means comprises means for storing a pointer to each $[A^B(C+1)+(A-B)+K]$th set at an address section allocated to a $[A^B.C+(A-B)+K]$th set, where A is a predetermined integer constant greater than 1, B is an integer parameter greater than 0, C is an integer parameter which is zero or greater, and K is a predetermined integer constant which is zero or greater.

Further preferably, in a storage apparatus according to the present invention, $1 \leq B \leq A$ and $K=0$.

Further preferably, in a storage apparatus according to the present invention, $A=4$.

Further preferably, in a storage apparatus according to the present invention, each set comprises a single value.

Further preferably, in a storage apparatus according to the present invention, each set comprises X values where X is an integer greater than 1.

Further preferably, in a storage apparatus according to the present invention, means for storing, for the or each data item, a pointer to an address allocated to the first set at an address section identified with the data item is contained.

Further preferably, in a storage apparatus according to the present invention, each of the address sections contains sufficient storage space for the set of values, the local pointer and the far pointer.

Further preferably, in a storage apparatus according to the present invention, each of the address sections contains sufficient storage space only for the set of values and any pointer which is storable at the address.

Further preferably, in a storage apparatus according to the present invention, means for copying the or each last value to another memory segment when the memory segment is full and means for erasing the memory segment is contained.

Further preferably, in a storage apparatus according to the present invention, a cache memory and means for storing in the cache memory the current value, the address of the current value and number of sets of the at least one data item is contained.

Further preferably, in a storage apparatus according to the present invention, reading means for: starting with the address allocated to the first set, checking the address for the presence of a far or local pointer; if a far pointer is present, checking the address to which the far pointer points for the presence of a far or local pointer; if there is a local pointer and no far pointer, checking the address for the presence of a far or local pointer to which the local pointer points; and, if there is neither a far pointer nor a local pointer, returning the latest value at the address, is contained.

Further preferably, in a storage apparatus according to the present invention, the means for checking for the presence of a far or local pointer comprises means for checking at least one pointer location at the address section and for indicating the presence of a pointer if the at least one location is in a non-reset state.

Further preferably, in a storage apparatus according to the present invention, the means for returning the latest value comprises means for storing in a cache memory the latest value, the most recently stored far pointer, and the address allocated to the latest value.

Further preferably, in a storage apparatus according to the present invention, a storage apparatus according to the present invention comprises a computer.

Next, in a storage apparatus according to the present invention, computer program for instructing a computer to perform a processing procedure of a memory control method as claimed in claim 1, thereby achieving the above-described objectives.

Also, a readable recording medium according to the present invention contains a control program as claimed in claim 38, thereby achieving the above-described objectives.

In view of the above described structures, the invention will be further described, by way of example, with reference to the accompanying drawings.

In a typical example of the present invention, instead of using a single linked chain for updates to a PDI (persistent data item), an acyclic graph structure is used. Each element has two pointers, instead of one, called L and F (for Local and Far) as well as the data value associated thereto. Local pointers follow a linear chain, but far pointers can jump over many intervening elements. The local pointer is initialised as in the chain method, but the far pointer is left at "FFFF" until the chain is long enough to merit a short-cut. When searching the graph, the rule is to take the far pointer, if it is not "FFFF", and otherwise follow the local pointer (and stop when the local pointer is "FFFF" too). There are many possible graph shapes which could be chosen and properties which make the choice efficient are as follows:

1. The graph must make the search time short, even if the whole segment is filled with a single PDI's updates;
2. Searching for the current value should require only a small amount of extra RAM to hold temporary values;
3. Update time should be about the same as searching time and use only a small amount of extra RAM to hold temporary values; and
4. To save memory capacity, it should be possible to cheaply calculate information about which nodes L and F sub-graphs attach as nodes are added. It should preferably not be necessary to store this information in the graph.

The "size" of a graph of updates is defined as the number of times the value it represents has been updated. A new PDI therefore has size 0; size 1 when its initial value is set; size 2 after it has been updated the first time; and so on. Since the graph always grows by adding one node at a time, its "shape" (i.e., the topological arrangement of its L and F pointers) for a given size can be predicted independently of the values it will store.

For the purpose of illustration, the shape will be considered of a graph which has grown to size Nmax (filling a whole segment, say) with just its L and F pointers but without the data values filled in yet. To reduce searching time to find the most recently added value, the values are added in depth-first, L-before-F order. It should be possible to detect efficiently when a sub-graph is considered "full" so that the new value can be place in a new sub-graph. To do this, it is necessary to keep track (at search time) of the available nodes where a sub-graph can be placed.

Address Contents [value, Local, Far]

| | |
|---|---|
| 0000 | [date0, FFFF, FFFF] |
| 0000 | [date0, 0006, FFFF] |
| 0006 | [date1, FFFF, FFFF] |
| 0000 | [date0, 0006, FFFF] |
| 0006 | [date1, 000C, FFFF] |
| 000C | [date2, FFFF, FFFF] |
| 0000 | [date0, 0006, FFFF] |
| 0006 | [date1, 000C, 0012] |
| 000C | [date2, FFFF, FFFF] |
| 0012 | [date3, FFFF, FFFF] |
| 0000 | [date0, 0006, FFFF] |
| 0006 | [date1, 000C, 0012] |
| 000C | [date2, 0012, FFFF] |
| 0012 | [date3, 0018, FFFF] |
| 0018 | [date4, FFFF, FFFF] |

When garbage collecting, the most recent value is found and copied into the new segment. The old segment can then be erased.

To find the start of the PDI graphs, an array of pointers is reserved at the start of each flash memory block or segment. The array is indexed by the identity of a PDI stored in that block and the content of that location is the required pointer. The table must be updated when it is copied as the result of a garbage collection.

Such an arrangement has the advantages that:

updating PDI's is fast;

PDI's do not need to have space allocated for them in advance and the updates proceed to fill available space efficiently. Many PDI's with greatly differing rates of growth can coexist easily within one segment;

data itself is compact, to reduce total storage requirements;

no RAM is required other than the few bytes of local storage required for the algorithms when they are actually running and a pointer to the next free memory available within the segment;

some RAM may be used, if available, to cache some pointers and values and so speed up access and update times; and garbage collection removing all update record but the last update record when the segment is full becomes simple.

BEST MODE FOR CARRYING OUT THE INVENTION

Hereinafter, an embodiment of a memory control method according to the present invention, which is applied to a storage apparatus below, will be described with reference to accompanying drawings.

Figure 1:
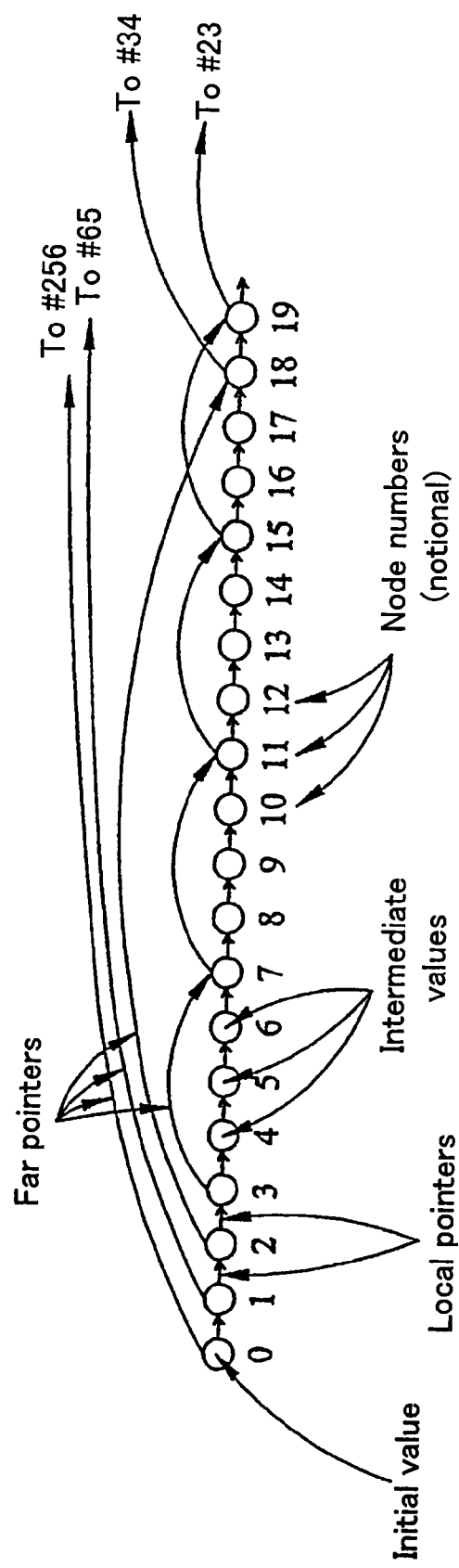
FIG. 1 illustrates the initial part of a PDI structure after a large number of updates in the storage apparatus according to the present invention.

FIG. 1 illustrates the initial part of a PDI structure after a large number of updates in the storage apparatus according to the present invention. In other words, FIG. 1 illustrates a specific example of the initial part of a structure for a specific PDI whose value has been updated many times according to the present invention. Each circle ○ represents a node in the PDI structure and is numbered in the order of updating of the PDI (persistent data item). Thus, the initial value is stored at node 0 and nodes 1 to 19 show the first 19 updates.

In FIG. 1, each time a PDI update value is stored by the entry of an updated value of the PDI, the immediately preceding node is also updated to contain a local pointer to the address of the new node. Thus, for example, when the sixth update of PDI has happened, nodes 0 to 6 contain the PDI values in the order of entries and each of nodes 0 to 5 contains a local pointer to the next node. When the seventh PDI updated value is entered, the value is entered at node 7. Although FIG. 1 illustrates a local pointer from node 6 to node 7, this in fact is not necessary and may be omitted because a far pointer is entered at node 3 such that subsequent searching to find the current value of the PDI will not use the local pointers at the nodes 4 to 6.

Instead, the searching of the PDI updated values follows the local pointers from the node 0 to node 3 and then the far pointer jumps to the node 7 so that the nodes 4 to 6, which are intermediate values, are never checked after the far pointer has been entered at the node 3. Thus, whenever a far pointer has been entered at a node of the structure, for example, the node previous to the node 7 does not need to contain a local pointer and memory space may be saved by not allocating space at this previous node for a local pointer.

Figure 2:
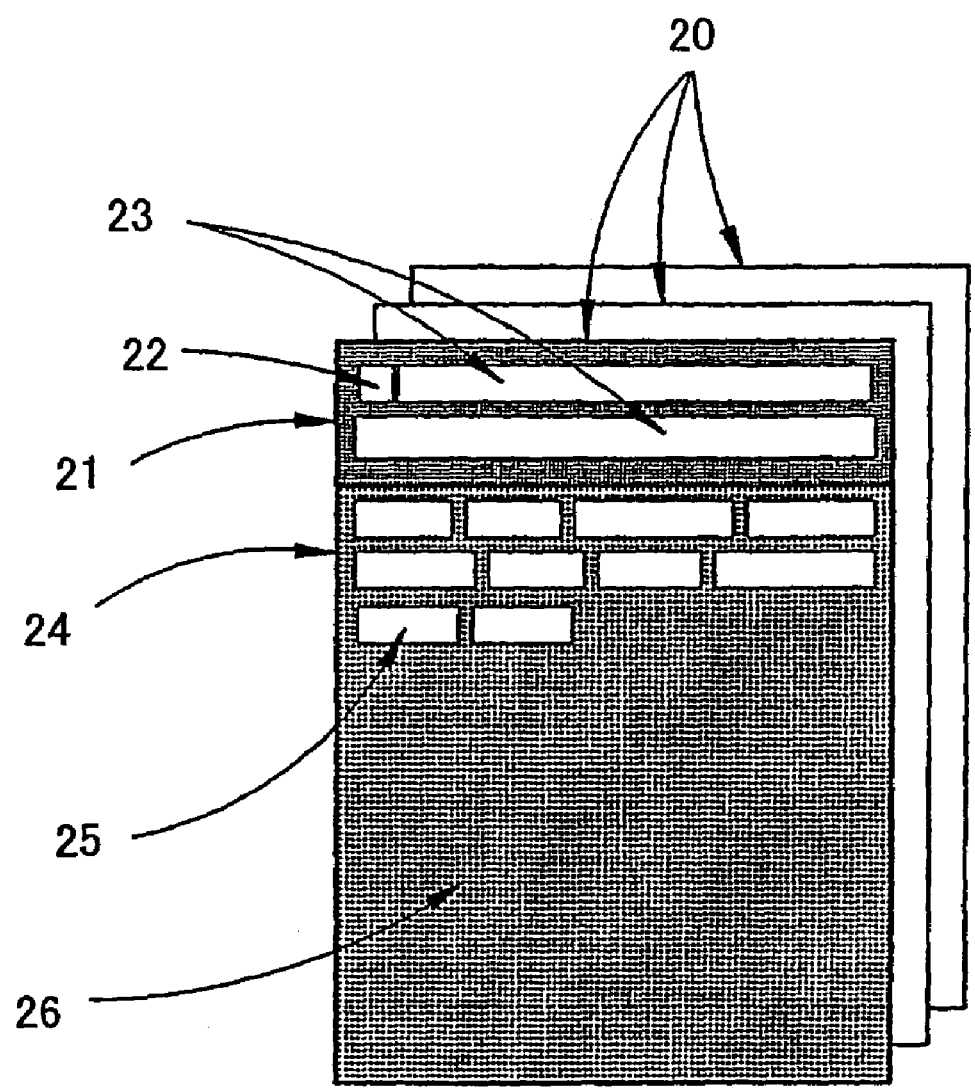
FIG. 2 illustrates the layout of data within a single flash segment in the storage apparatus according to the present invention.

FIG. 2 illustrates the layout of data in a flash memory comprising a plurality of segments 20. The flash segments 20 are erasable as a whole and the data layout for one of the segments is illustrated. In FIG. 2, this segment contains a fixed segment or "page" header (fixed page header) 21 with space pre-allocated for a page identifier and status 22 and an ID table 23 of this segment containing an entry for each PDI to be stored in the segment 20. Each entry is addressable by an identifier associated with the PDI and contains a pointer to the address containing the first node of the PDI.

The remainder area of the segment 20 comprises a page data area 24 which is filled sequentially as updated values of each PDI arrive (entry). When the first value arrives, it is stored at the next available address in the data area 24 and the address is entered in the Table 23. Subsequent updates are stored at the next available address and previous nodes are updated with local or far pointers as appropriate.

FIG. 1 represents the far pointer destinations by the notional node number but, in practice, the actual memory address within the data area 24 is entered as the local or far pointer. Filling up of the data area 24 is illustrated by the nodes 25 in a PDI graph as shown in FIG. 2 and the free space 26 available for storing update contents.

Figure 3:
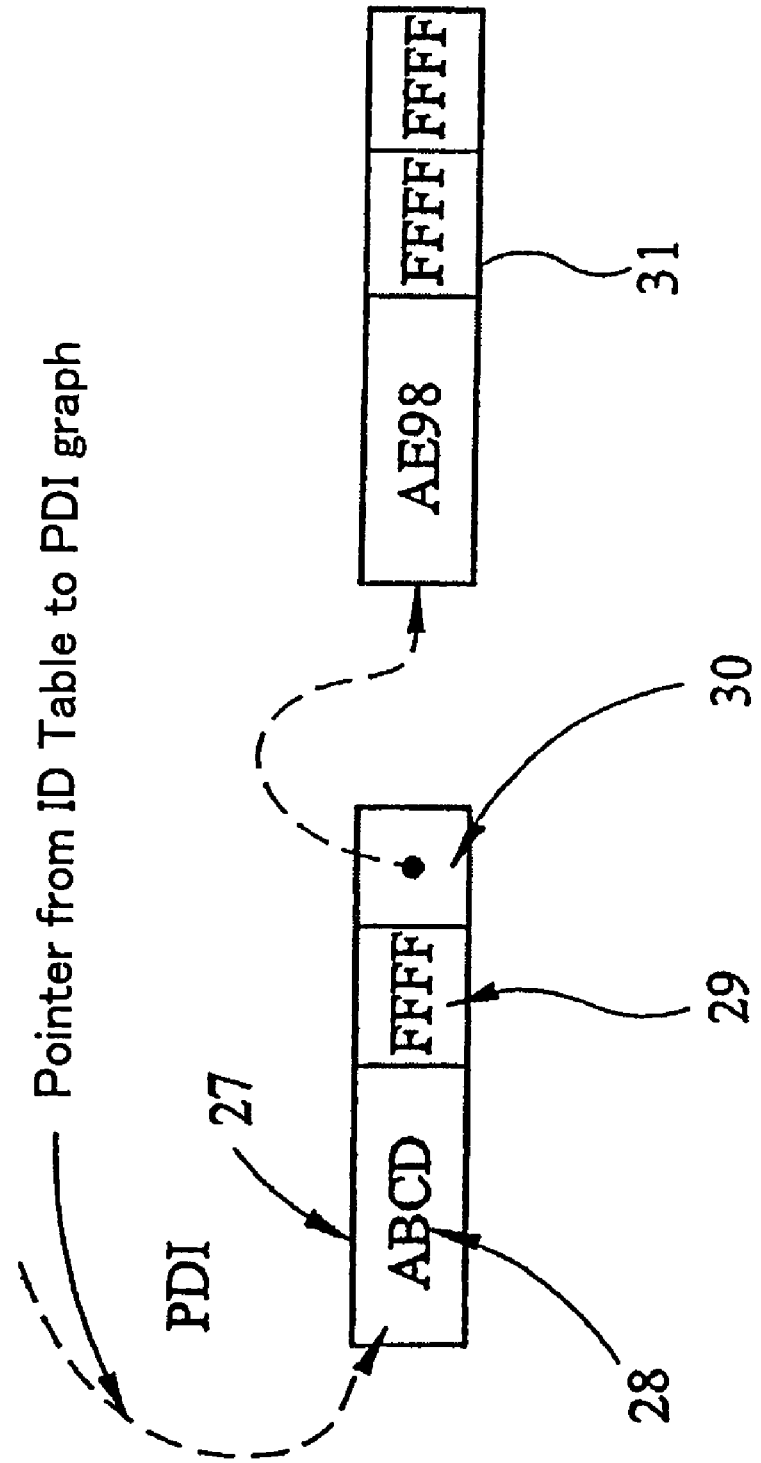
FIG. 3 illustrates the structure of PDI nodes in a flash memory in the storage apparatus according to the present invention.

FIG. 3 illustrates a typical PDI node structure in the flash memory. The address of the first value in the Table 23 points to the first node 27 in the PDI graph. The first node 27 in the PDI graph has memory space allocated for storing a data value 28, a far pointer 29 and a local pointer 30. In this example, a data value 28 is "ABCD" (in hexadecimal), it is assumed that the far pointer 29 has not been entered so that the entry is the erased state "FFFF" (in hexadecimal). However, a subsequent value has been entered at the node 31 and the local pointer 30 has been set to the address of the node 31. The node 31 contains, for example, the data value AE98 (in hexadecimal) but the local and far pointers are "FFFF", and remain in the erased state.

Figure 4:
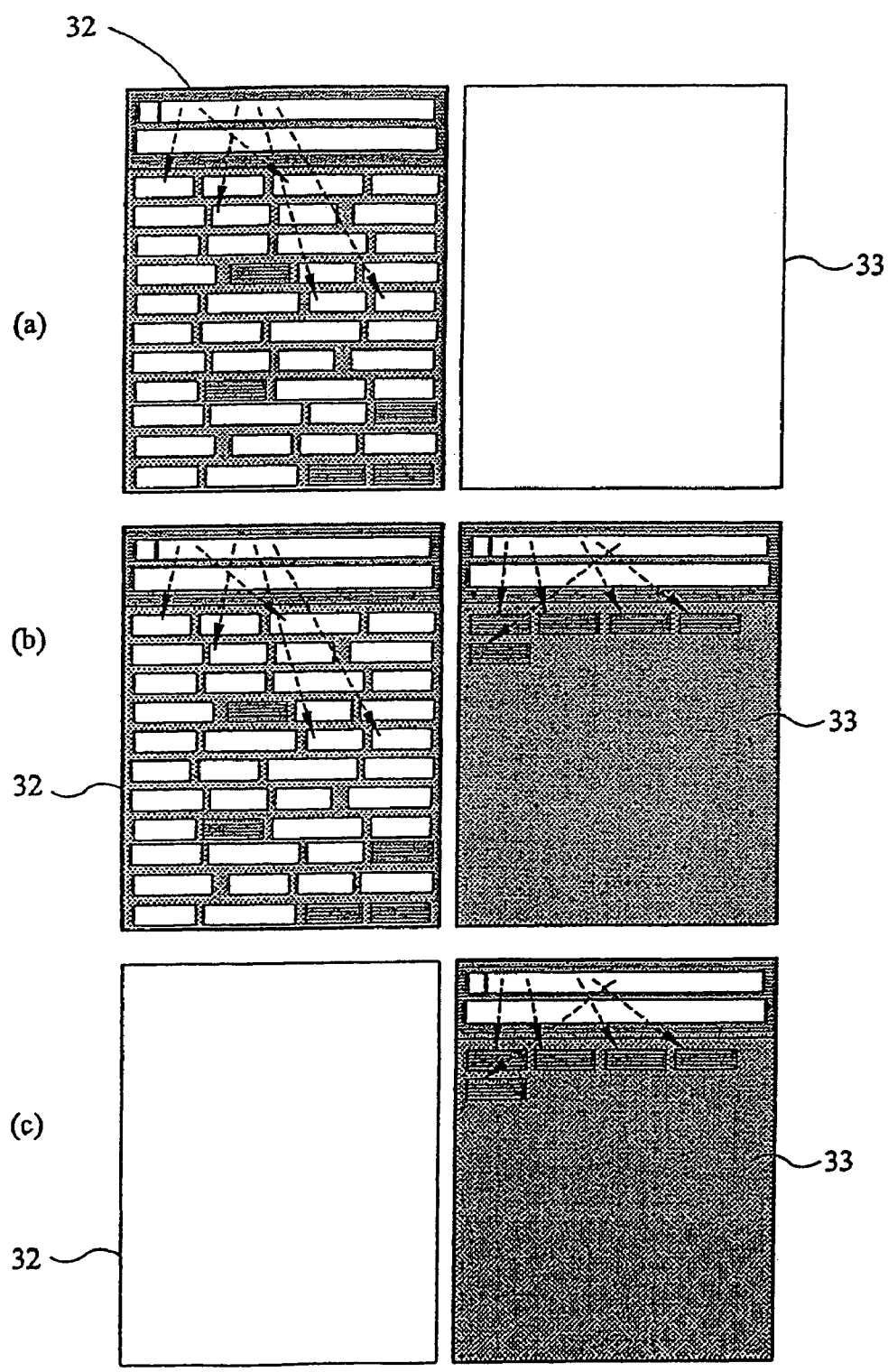
FIG. 4 illustrates an example of garbage collection in the storage apparatus according to the present invention.

FIGS. 4(*a*) through 4(*c*) illustrate three steps in a garbage collection operation according to the present invention. A segment or page 32 has been filled with updated values whereas a next segment 33 is empty and available for use as illustrated in FIG. 4(*a*). In order to allow the PDI updated values to continue to be updated and the segment 32 to be all erased for subsequent use, the latest values of PDI updated values are searched and found in the data area of the segment 32 and are copied into the segment 33 as shown at FIG. 4(*b*). The fixed page header of the segment 33 is formed by entering the page identifier and status and the table of pointers for the PDIs to the first entries in the page 33. Subsequent updated values are stored in the page 33 as described hereinbefore and, as shown at (c) in FIG. 4, the page 32 can be erased and is available for subsequent use.

Figure 5:
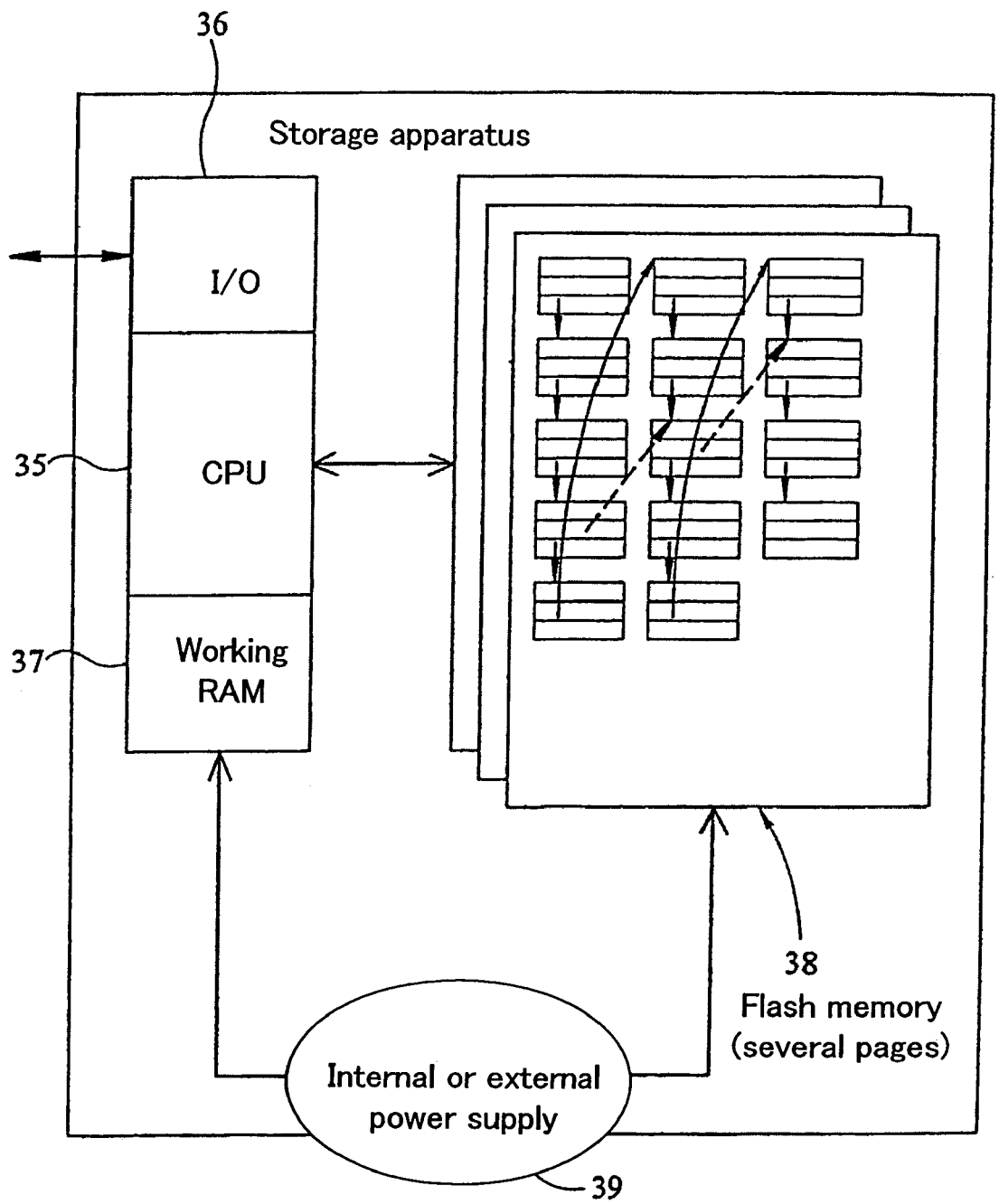
FIG. 5 illustrates an embedded system constituting an embodiment of the invention.

FIG. 5 illustrates schematically an example of a typical arrangement of a small computer which may implement the storing and reading of PDI update values in the present invention.

This small computer forms a storage apparatus and comprises an input/output (IO) interface 36 facing outside, working memory in the form of a small random access memory (RAM) 37, a CPU (central processing unit) 35 as a controlling section, a non-volatile memory in the form of several pages of flash memory 38, and an internal or external power supply 39 which supplies power to these components.

For example, where the storage apparatus is a smart card, the power supply 39 is external, for example in a card reader, so that power is supplied to the storage apparatus only intermittently. Where the storage apparatus is installed, for example, in a vehicle, the power supply 39 may comprise the vehicle power supply and may be made available only when, for example, the vehicle ignition system is switched on. Where the storage apparatus is intended to be used continuously, such as a remote internet router, the power supply 39 is intended to supply power continuously and the storage apparatus is capable of retaining its recording state in the event of a power failure. This allows the storage apparatus to be re-commissioned relatively easily when power can be restored.

In a specific example illustrating an embodiment, each PDI is allocated a unique 16 bit identifier (ID), giving a theoretical address space of up to 65536 PDI's. In the simplest embodiment, only a single flash segment 20 is used to store PDI's, and this restricts the number of PDI's which can be handled. ID's are allocated sequentially. If a maximum of M PDI's are to be handled, then an array of M pointers (indexed by ID) are allocated in the Table 23 at the beginning of the block and PDI chains are allocated after this such that the jth element of the array contains data for the PDI whose ID is equal to j. The jth element is either "FFFF" (when the PDI has not been allocated yet) or another value which represents the offset in the block of the start of the PDI's graph.

In the graph itself, each node is numbered as shown in FIG. 1 starting from the initial value "0" which represents the original value. Each time a new element n is added, it is linked from the element n−1, and possibly from another earlier element, as follows:

Each node of the form 256c+0 links to node 256 (c+1)+0.
Each node of the form 64c+1 links to node 64 (c+1)+1.
Each node of the form 16c+2 links to node 16 (c+1)+2.
Each node of the form 4c+3 links to node 4 (c+1)+3.

The numbers (4, 16, 64, 256) have been chosen to produce reasonable search times for a 64 KB segment size, but they can be changed as necessary and are not limited to just four numbers. In this case, it is very easy (a simple AND and COMPARE operation) to determine if a node has a second pointer, because the multiples are powers of two. Each number divides the next larger number, and this makes the scheme simpler, but it is not a necessary simplification.

Nodes are added and pointers updated in accordance with the following program given in C style:

```
newtype element = record {value v, element* L, element* F}
procedure updatevalue_graph (element* startaddress, value newvalue)
  = {
    element* p = startaddress;
    element* newp = malloc (sizeof (element)); // space for a new
element, see below
      newp->v = newvalue; // store the new value in the new element
      // note: newp.L and newp.F will be initially 0xFFFF
      element* p4=0xFFFF, p16=0xFFFF, p64=0xFFFF, p256=0xFFFF;
      int currentnode = 0;
      while (true)
        {
        if (p->F != 0xFFFF) // following a far link
          {
          if (currentnode mod 256 = = 0)
            {p = p->F; currentnode = currentnode + 256;}
          else if (currentnode mod 64 = = 1)
            {p = p->F; currentnode = currentnode + 64;}
          else if (currentnode mod 16 = = 2)
            {p = p->F; currentnode = currentnode + 16;}
          else if (currentnode mod 4 = = 3)
            {p = p->F; currentnode = currentnode +4;}
          else
            {ERROR!}
          }
        else if (p->L != 0xFFFF) // following a local link
          {
          if (currentnode mod 256 = = 0)
            {p256 = p;}
          else if (currentnode mod 64 = = 1)
            {p64 = p;}
          else if (currentnode mod 16 = = 2)
            {p16 = p;}
          else if (currentnode mod 4 = = 3)
            {p4 = p;}
          p = p->L;
          currentnode = currentnode + 1;
          }
        else // reached end of chain
          {
          // (at this point p->v holds the pre-update value)
          p->L = newp;
          currentnode = currentnode + 1;
          if (currentnode mod 256 = = 0 AND p256 != 0xFFFF)
            {p256->F = newp;}
          else if (currentnode mod 64 = = 1 AND p64 != 0xFFFF)
            {p64->F = newp;}
          else if (currentnode mod 16 = = 2 AND p16 != 0xFFFF)
            {p16->F = newp;}
          else if (currentnode mod 4 = = 3 AND p4 != 0xFFFF)
            {p4->F = newp;}
          return;
          }
        }
  }
```

The example of a list of updates with shortcuts of lengths 256, 64, 16 and 4 is not the only possible choice. In a more general case, there will be L levels of shortcuts of lengths s(1) . . . , s(L), with s(i)>S(i+1)+1 for all i in $\{1, \ldots, L-1\}$ and s(L)>1.

In an update list U of length n>0, the level 1 shortcuts form a sublist of one or more elements, starting at the first element:

$$U(1), U(1+s(1)), \ldots, U(1+k(1)s(1))$$

for some k (1)≧0.

If the level 1 sublist does not reach the end of the list, that is, if n>1+k(1)s(1), then the level 2 shortcuts form a sublist of one or more elements, starting one element past the end of the level 1 sublist:

$$U(2+k(1)s(1)), U(2+k(1)s(1)+s(2)), \ldots, U(2+k(1)s(1)+k(2)s(2))$$

for some k(2)≧0.

This pattern continues for L levels. At level m, if n>(m−1)+k(1)s(1)+k(2)s(2)+ . . . +k(m−1)s (m−1), the level m shortcuts form a sublist consisting of $$U(m+k(1)s(1)+k(2)s(2)+ \ldots +k(m-1)s(m-1)),$$

$$U(m+k(1)s(1)+k(2)s(2)+ \ldots +k(m-1)s(m-1)+s(m))$$

$$U(m+k(1)s(1)+k(2)s(2)+ \ldots +k(m-1)s(m-1)+k(m)s(m))$$

The length of this sublist is k(m)+1.

To make each sublist as long as possible, each k (m) must be the maximum value such that:

$$m+k(1)s(1)+ \ldots +k(m-1)s(m-1)+k(m)s(m) \leq n$$

This occurs when:

$$k(1) = (n-1) \, div \, s \quad (1)$$

$$\vdots$$

$$k(m) = (n-m-k(1)s(1)- \ldots -k(m-1) \, s \, (m-1)) \, div \, s \, (m)$$

where 'div' represents integer division. The remainder from this division, $$r(m)=(n-m-k(1)s(1)- \ldots -k(m-1)s(m-1)) \, mod \, s(m)$$

gives the number of elements of U which follow the end of the level m sublist.

The lengths of shortcut lists and remainders are bounded by $$r(m) <= s(m)-1$$

and $$k(m) <= (s(m-1) \text{ div } s(m))-1$$

A level m sublist exactly reaches the end of the list if r(m)=0, that is:

$$(n-m-k(1)s(1)- \ldots -k(m-1)s(m-1)) \bmod s(m)=0$$

If the shortcut lengths are chosen with each s(i) an exact multiple of s(i+1), this condition is simplified to $$(n-m) \bmod s(m)=0$$

or $$n \bmod s(m)=m$$

The cost C(n) of finding the last element of an update list of length n is the sum of the lengths of the shortcut sublists, plus the length of the remainder of the list after the last shortcut. In the worst case, when n≧L and no shortcut exactly reaches element n, a bound for the cost is given by:

$$C(n) = k(1) + 1 + k(2) + 1 + \ldots + k(L) + 1 + r(L) \le$$
$$((n-1)div\, s(1)) + (s(1)div\, s(2)) + \ldots + (s(L-1)div\, s(L)) + s(L) - 1$$

Choosing values for L and s(i) in this case to optimise C(n) is an engineering trade off which depends on the expected value of n (i.e., how long the update lists grow). A large value for the largest shortcut s(1) will minimise the first term ((n−1) div s(1)) which will dominate the cost for large n. A small value for the smallest shortcut s(L) will minimise the number of non-shortcut steps given by the term s(L)−1, which does not depend on n. On the other hand, increasing the ratio s(1)/s(L) will increase the sub-or-quotients term:

$$(s(1) \text{ div } s(2))+ \ldots +(s(L-1) \text{ div } s(L))$$

either by increasing individual ratios (s(i) div s(i+1)) or by increasing the number of shortcut levels L required to bridge the gap.

Figure 6:
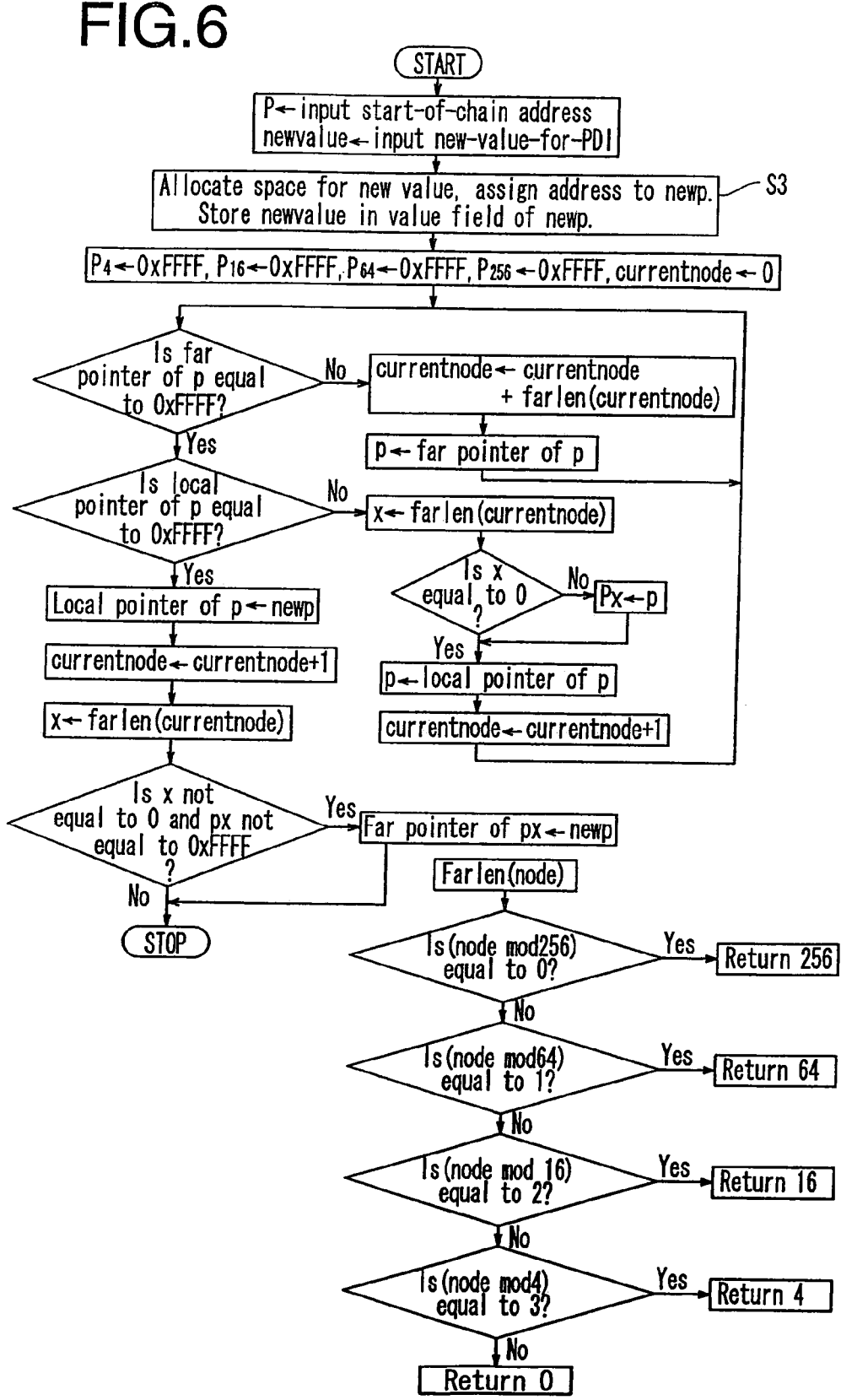
FIG. 6 is a flow diagram illustrating updating of values in accordance with an embodiment of the invention.

FIG. 6 represents operations by the control program for updating PDI values according to the present invention in flow diagram form.

In the flow diagram of FIG. 6, p is a pointer to a node in the PDI graph. The far pointer of p is the far field stored in the PDI structure to which p points. Similarly, the local pointer of p is the local field in the PDI structure to which p points. The small variables $p_4$, $p_{16}$, $p_{64}$ and $p_{256}$ are bookmarks of past slots for far pointers and are referred to as $p_x$; the selection depends on the value of X:4, 16, 64 or 256. The flow chart also contains a subroutine "farlen" with "node" as its parameter.

In the step S3, a contiguous block of memory is allocated with enough space to store the new value and its pointer. The address of the memory block is stored in a pointer variable "newp".

If the storage apparatus has a RAM of a sufficient memory capacitance, the current value, the last chain position and the last chain number may be stored in RAM for some or all of the PDIs when the storage apparatus starts operating. This part of the RAM is thus used as a type of cache memory.

Although this requires time during the start-up, subsequent looking up for reading and updating is much faster.

When an update value is read from the flash memory, the most recent pointers may be cached together with the pointer to the current value because this variable is most likely to be the next one to be changed. Storing the far pointer makes updating faster.

Figure 7:
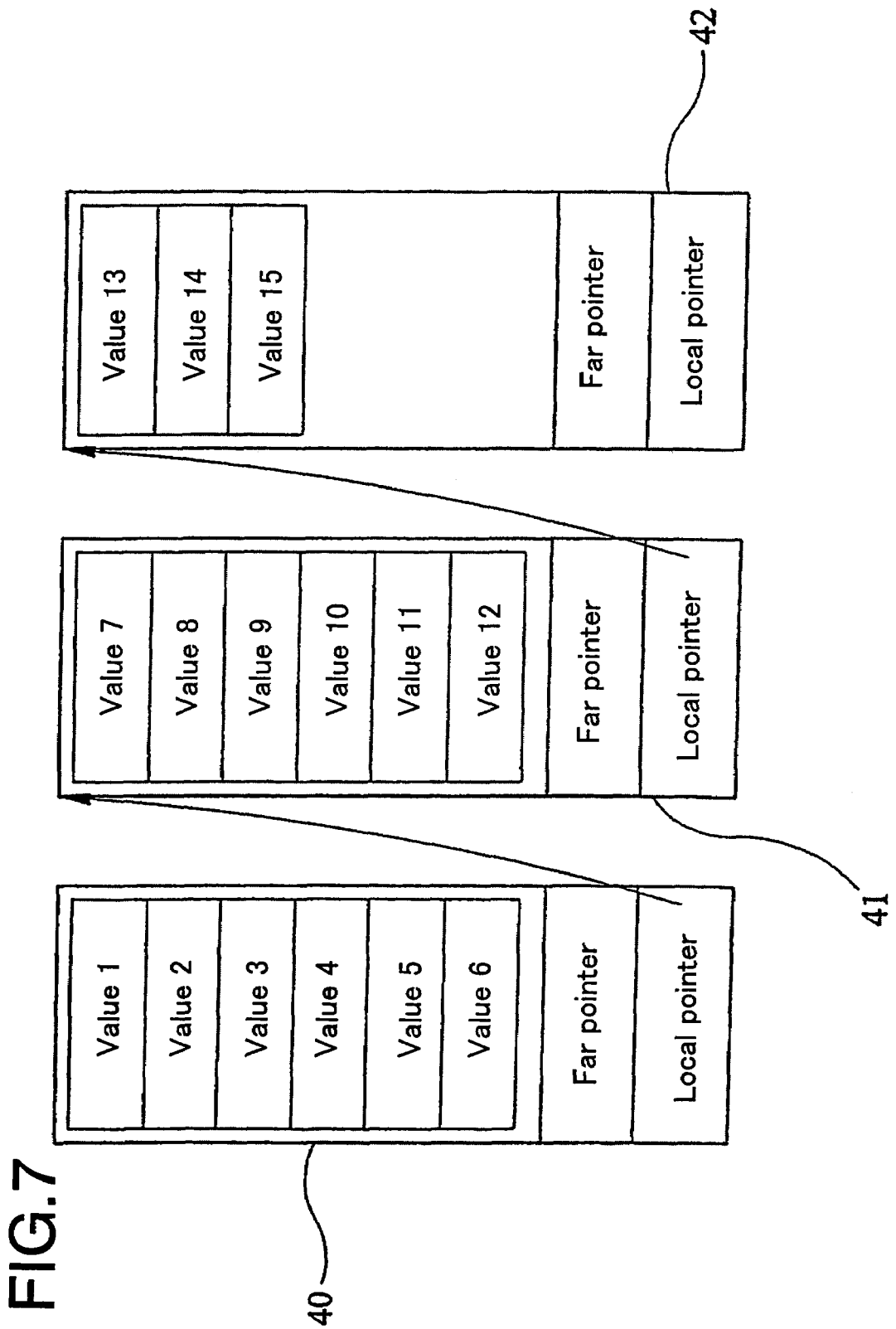
FIG. 7 illustrates the arrangement of values and pointers in a hybrid system for managing updates.
Figure 8:
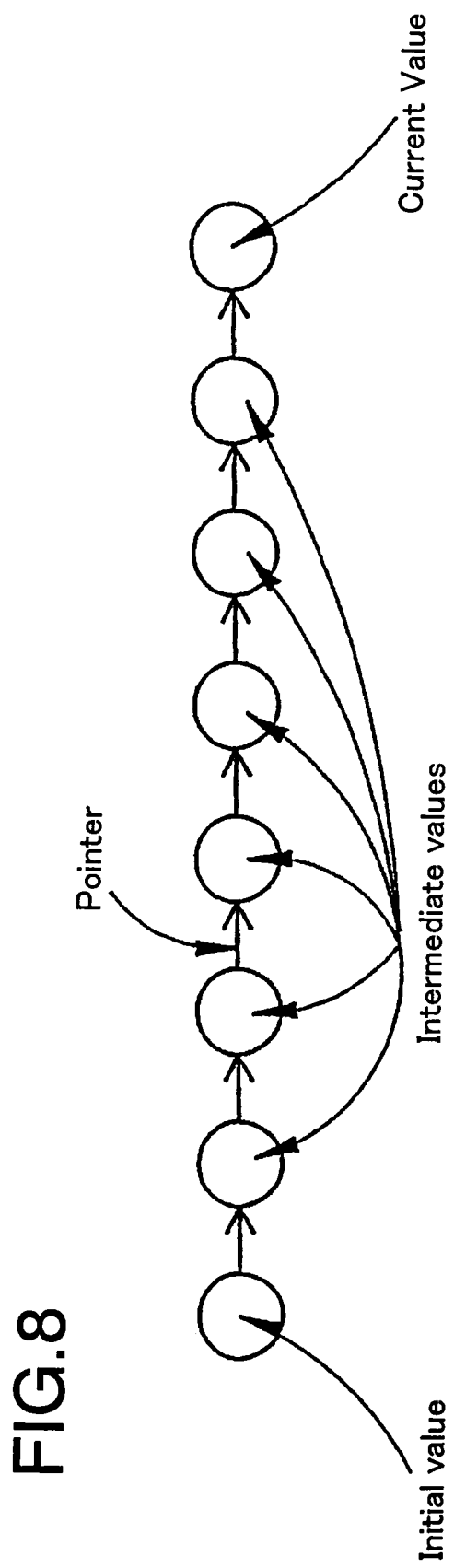
FIG. 8 illustrates a known type of single chain of pointers as described hereinbefore.

Although each node may have space for a single value of its PDI, an alternative arrangement is possible whereby any or all of the nodes may have space available for storing several updated values. Such an arrangement is illustrated in FIG. 7 where each of the nodes 40 to 42 has space for six values together with local and far pointers. In this case, instead of allocating each new value to a new node, the values are entered in the spaces in each node until that node is full. The next value is then entered in the first value space of another node and the local pointer in the previous node is set to point to the new node. FIG. 7 illustrates the situation after 15 updates with the nodes 40 and 41 being full, the local pointer of the node 40 pointing to the node 41, the local pointer of the node 41 pointing to the node 42, and the other pointers in the nodes 40, 41 and 42 being in their reset state. In order to simplify searching, each such node may have a word with a number of bits equal to the number of updates which can be stored. Each bit corresponds to the space for an update and is set when that space is occupied by an updated value so as to make searching the node easier.

As described above, according to an embodiment of the present invention, a technique can be provided for storing updated values of a PDI (data item) in a segment of memory in which stored values cannot be individually overwritten, such as a flash memory. Each updated value is stored at an address which has space for a far pointer and a local pointer. When a new value is stored, the local pointer of the previous value is set to point to the address of the new value. When a chain of nodes of this type has been established and a further PDI update value is to be stored, it is entered at a new node and a far pointer at a much earlier node of the chain is set to point to the new node so that the most recent value can be found without having to follow the local pointers in all of the previous nodes. Thus, PDIs can be updated fast. Therefore, space allocated for the PDI in advance is not required, and the updates are sequentially proceeded to fill available space efficiently. Many PDIs with greatly differing rates of growth can coexist easily within one segment. Accordingly, total storage requirements can be reduced so that data itself becomes compact.

INDUSTRIAL APPLICABILITY

In a field of a storage apparatus using a memory control method of storing temporally consecutive values to enable reading the latest value, PDIs can be updated fast. Furthermore, space allocated for the PDI in advance is not required, and the updates are sequentially proceeded to fill available space efficiently. Many PDIs with greatly differing rates of growth can coexist easily within one segment. Accordingly, total storage requirements can be reduced so that data itself becomes compact.

The invention claimed is:

1. A memory control method of storing temporally consecutive values of at least one data item in a memory segment of a type in which stored values cannot be individually overwritten, comprising the steps of:

(a) storing sets of the consecutive values at respective address sections which are allocated temporally consecutively for the or each data item;
(b) storing far pointers to the addresses of some of the sets of values in accordance with a scheme in which each far pointer to each $(A^B(C+1)+(A-B)+K)$th set is stored at an address allocated to a $(A^BC+(A-B)+K)$th set, where A is a predetermined integer constant greater than one, B is an integer parameter such that $1 \leq B \leq A$ but excluding the case where B has a single value, C is an integer parameter greater than 1, and K is a predetermined integer constant greater than 1; and
(c) storing a local pointer to the address allocated to each set other than the some sets at the address section allocated to the set immediately preceding each other set,
wherein each of the address sections is allocated when the value or a first value of a new set is received for storing and each far and local pointer is stored at its previously allocated address section after an address to which it points has been allocated to the new set.

2. A memory control method of storing temporally consecutive values of at least one data item in a memory segment of a type in which stored values cannot be individually overwritten, comprising the steps of:
(a) storing sets of the consecutive values at respective address sections which are allocated temporally consecutively for the or each data item;
(b) storing far pointers to the addresses of some of the sets of values in accordance with a scheme in which each far pointer to each $(A^B(C+1)+(A-B)+K)$th set is stored at an address allocated to a $(A^BC+(A-B)+K)$th set, where A is a predetermined integer constant greater than one, B is an integer parameter having all values such that $1 \leq B \leq A$, C is an integer parameter greater than 1, and K is a predetermined integer constant greater than 1; and
(c) storing a local pointer to the address allocated to each set other than the some sets at the address section allocated to the set immediately preceding each other set,
wherein each of the address sections is allocated when the value or a first value of a new set is received for storing and each far and local pointer is stored at its previously allocated address section after an address to which it points has been allocated to the new set.

3. A memory control method as claimed in claim 1 or 2, characterised in that the memory segment is non-volatile.

4. A memory control method as claimed in claim 1 or 2, characterised in that the memory segment is erasable only as a whole.

5. A memory control method as claimed in claim 4, characterised in that the memory segment comprises at least part of a flash memory.

6. A memory control method as claimed in claim 1 or 2, characterised in that each set comprises a single value.

7. A memory control method as claimed in claim 1 or 2, characterised in that each set comprises X values where X is an integer greater than one.

8. A memory control method as claimed in claim 1 or 2, characterised by storing, for the or each data item, a pointer to an address allocated to the first set at an address section identified with the data item.

9. A memory control method as claimed in claim 1 or 2, characterised in that each of the address sections contains sufficient storage space for the set of values, the local pointer and the far pointer.

10. A memory control method as claimed in claim 1 or 2, characterised in that each of the address sections contains sufficient storage space only for the set of values and any pointer which is storable at the address.

11. A memory control method as claimed in claim 1 or 2, characterised in that, when the memory segment is full, the most recently received value of the or each data item is copied to another memory segment, after which the memory segment is erased.

12. A memory control method as claimed in claim 1 or 2, characterised by storing in: a cache memory a most recently received value, an address of the most recently received value and the number of the sets of the at least one data item.

13. A control program for programming a computer to perform a memory control method as claimed in claim 1 or 2.

14. A readable storage medium containing a control program as claimed in claim 13.

15. A memory control method as claimed in claim 1 or 2, in which each of the far pointers points to an address allocated after a plurality of sets for the data item has been stored since the set at the address at which the far point is stored.

16. A memory control method as, claimed in claim 1 or 2, in which K=0.

17. A memory control method as claimed in claim 16, in which A=4.

18. A memory control method of storing temporally consecutive values of at least one data item in a memory segment of a type in which stored values cannot be individually overwritten, comprising the steps of:
(a) storing sets of the consecutive values at respective address sections which are allocated temporally consecutively for the or each data item;
(b) storing far pointers to the addresses of some of the sets of values in accordance with a scheme in which each far pointer to each $(A^B (C+1)+(A-B)+K)$th set is stored at an address allocated to a $(A^BC+(A-B)+K)$th set, where A is a predetermined integer constant greater than one, B is an integer parameter such that $1 \leq B \leq A$ but excluding the case where B has a single value, C is an integer parameter greater than 1, and K is a predetermined integer constant greater than 1; and
(c) storing a local pointer to the address allocated to each set other than the some sets at the address section allocated to the set immediately preceding each other set, said method comprising, starting with the address allocated to the first set:
(i) checking the address for the presence of a far or local pointer;
(ii) if a far pointer is present, performing the step (i) for the address to which the far pointer points;
(iii) if there is a local pointer and no far pointer, performing the step (i) for the address to which the local pointer points;
(vi) if there is neither a far pointer nor a local pointer, returning the latest value at the address.

19. A memory control method of storing temporally consecutive values of at least one data item in a memory segment of a type in which stored values cannot be individually overwritten, comprising the steps of:
(a) storing sets of the consecutive values at respective address, sections which are allocated temporally consecutively for the or each data item;
(b) storing far pointers to the addresses of some of the sets of values in accordance with a scheme in which each far pointer to each $(A^B (C+1)+(A-B)+K)$th set is stored at an address allocated to a $(A^B C+(A-B)+K)$th set, where A is a predetermined integer constant greater than one, B is an integer parameter having all values such that $1 \leq B \leq A$, C is an integer parameter greater than 1, and K is a predetermined integer constant greater than 1; and (c) storing a local pointer to the address allocated to each set other than the some sets at the address section allocated to the set immediately preceding each other set, said method comprising, starting with the address allocated to the first set:

(i) checking the address for the presence of a far or local pointer;

(ii) if a far pointer is present, performing the step (i) for the address to which the far pointer points;

(iii) if there is a local pointer and no far pointer, performing the step (i) for the address to which the local pointer points;

(vi) if there is neither a far pointer nor a local pointer, returning the latest value at the address.

20. A memory control method as claimed in claim 18 or 19, characterised in that the step (i) comprises checking at least one pointer location at the address and indicating the presence of a pointer if the at least one location is in a non-reset state.

21. A memory control method as claimed in claim 18 or 19, characterised in that the step (iv) comprises storing in a cache memory the latest value, the most recently stored far pointer, and the address allocated to the latest value.

22. A storage apparatus for storing temporally consecutively values of at least one data item, comprising a memory segment of a type in which stored values cannot be individually overwritten and means for storing sets of the consecutive values at respective address sections which are allocated temporally consecutively for the or each data item, characterised by comprising means for storing far pointers to the addresses of some of the sets of values in accordance with a scheme in which each far pointer to each $(A^B(C+1)+(A-B)+K)$th set is stored at an address allocated to a $(A^B C+(A-B)+K)$th set, where A is a predetermined integer constant greater than one, B is an integer parameter such that $1 \leq B \leq A$ but excluding the case where B has a single value, C is an integer parameter greater than 1, and K is a predetermined integer constant greater than 1, and means for storing a local pointer to the address allocated to each set other than the some sets at the address section allocated to the set immediately preceding each other set, wherein each of the address sections is allocated when the value or a first value of a new set is received for storing and each far and local pointer is stored at its previously allocated address section after an address to which it points has been allocated to the new set.

23. A storage apparatus for storing temporally consecutively values of at least one data item, comprising a memory segment of a type in which stored values cannot be individually overwritten and means for storing sets of the consecutive values at respective address sections which are allocated temporally consecutively for the or each data item, characterised by comprising means for storing far pointers to the addresses of some of the sets of values in accordance with a scheme in which each far pointer to each $(A^B(C+1)+(A-B)+K)$th set is stored at an address allocated to a $(A^B C+(A-B)+K)$th set, where A is a predetermined integer constant greater than one, B is an integer parameter having all values such that $1 \leq B \leq A$, C is an integer parameter greater than 1, and K is a predetermined integer constant greater than 1, and means for storing a local pointer to the address allocated to each set other than the some sets at the address section allocated to the set immediately preceding each other set, wherein each of the address sections is allocated when the value or a first value of a new set is received for storing and each far and local pointer is stored at its previously allocated address section after an address to which it points has been allocated to the new set.

24. A storage apparatus as claimed in claim 22 or 23, characterised in that the memory segment is non-volatile.

25. A storage apparatus as claimed in claim 22 or 23, characterised in that the memory segment is erasable only as a whole.

26. A storage apparatus as claimed in claim 25, characterised in that the memory segment comprises at least part of a flash memory.

27. A storage apparatus as claimed in claim 22 or 23, characterised in that each set comprises a single value.

28. A storage apparatus as claimed in claim 22 or 23, characterised in that each set comprises X values where X is an integer greater than 1.

29. A storage apparatus as claimed in claim 22 or 23, characterised by comprising means for storing, for the or each data item, a pointer to an address allocated to the first set at an address section identified with the data item.

30. A storage apparatus as claimed in claim 22 or 23, characterised in that each of the address sections contains sufficient storage space for the set of values, the local pointer and the far pointer.

31. A storage apparatus as claimed in claim 22 or 23, characterised in that each of the address sections contains sufficient storage space only for the set of values and any pointer which is storable at the address.

32. A storage apparatus as claimed in claim 22 or 23, characterised by comprising means for copying the most recently received value of the or each data item to another memory segment when the memory segment is full and means for erasing the memory segment.

33. A storage apparatus as claimed in claim 22 or 23, characterised by comprising a cache memory and means for storing in the cache memory a most recently received value, the address of the current value and number of sets of the at least one data item.

34. A storage apparatus as claimed in claim 22 or 23, characterised by comprising reading means for: starting with the address allocated to the first set, checking the address for the presence of a far or local pointer; if a far pointer is present, checking the address to which the far pointer points for the presence of a far or local pointer; if there is a local pointer and no far pointer, checking the address for the presence of a far or local pointer to which the local pointer points; and, if there is neither a far pointer nor a local pointer, returning the latest value at the address.

35. A storage apparatus as claimed in claim 34, characterised in that the means for checking for the presence of a far or local pointer comprises means for checking at least one pointer location at the address section and for indicating the presence of a pointer if the at least one location is in a non-reset state.

36. A storage apparatus as claimed in claim 34, characterised in that the means for returning the latest value comprises means for storing in a cache memory the latest value, the most recently stored far pointer, and the address allocated to the latest value.

37. A storage apparatus as claimed in claim 22 or 23, characterised by comprising a computer.

38. A storage apparatus as claimed in claim 22 or 23, in which each of the far pointers points to an address allocated after a plurality of sets for the data item has been stored since the set at the address at which the far point is stored.

39. A storage apparatus as claimed in claim 22 or 23, in which K=0.

40. A storage apparatus as claimed in 39, in which A=4.

* * * * *